United States Patent
Ramle et al.

(10) Patent No.: US 10,462,644 B2
(45) Date of Patent: Oct. 29, 2019

(54) MAPPING OF S-NSSAI AT ROAMING

(71) Applicant: Telefonaktiebolaget LM Ericsson (publ), Stockholm (SE)

(72) Inventors: Peter Ramle, Mölnlycke (SE); Aldo Bolle, Västra Frölunda (SE); Peter Hedman, Helsingborg (SE); Lars-Bertil Olsson, Angered (SE); Paul Schliwa-Bertling, Ljungsbro (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 16/317,343

(22) PCT Filed: Jun. 12, 2018

(86) PCT No.: PCT/EP2018/065428
§ 371 (c)(1),
(2) Date: Jan. 11, 2019

(87) PCT Pub. No.: WO2018/234085
PCT Pub. Date: Dec. 27, 2018

(65) Prior Publication Data
US 2019/0261157 A1    Aug. 22, 2019

Related U.S. Application Data

(60) Provisional application No. 62/523,092, filed on Jun. 21, 2017.

(51) Int. Cl.
*H04W 4/00* (2018.01)
*H04W 8/06* (2009.01)
*H04W 8/08* (2009.01)

(52) U.S. Cl.
CPC .............. *H04W 8/06* (2013.01); *H04W 8/08* (2013.01)

(58) Field of Classification Search
CPC .................................. H04W 8/06; H04W 8/08
(Continued)

(56) References Cited

U.S. PATENT DOCUMENTS

| 2003/0097584 A1* | 5/2003 | Haukka | H04L 29/06 726/7 |
| 2010/0273511 A1* | 10/2010 | Chen | H04W 4/90 455/458 |
| 2018/0160387 A1* | 6/2018 | Chastain | H04W 60/04 |

FOREIGN PATENT DOCUMENTS

| WO | 2016/192636 A1 | 12/2016 |
| WO | 2017/063708 A1 | 4/2017 |

OTHER PUBLICATIONS

International Search Report and Written Opinion dated Oct. 15, 2018 issued in International Application No. PCT/EP2018/065428. (12 pages).

(Continued)

*Primary Examiner* — Nghi H Ly
(74) *Attorney, Agent, or Firm* — Rothwell, Figg, Ernst & Manbeck, P.C.

(57) ABSTRACT

A method for registering a UE in a visited network. The method includes the UE selecting a home network slice identity (h-NSI), wherein the h-NSI is associated with an index value. The method also includes the UE obtaining the index value with which the selected h-NSI is associated, and after obtaining the index value, the UE transmitting a registration message towards a control node, the registration message comprising a requested NSI (r-NSI) (e.g., an S-NSSAI) and the obtained index value. The method further includes the UE receiving a registration response message comprising an allowed NSI (a-NSI) and an index value associated with the a-NSI.

23 Claims, 11 Drawing Sheets

(58) Field of Classification Search
USPC ..... 455/432.1, 435.1, 414.1, 422.1, 411, 418
See application file for complete search history.

(56) References Cited

OTHER PUBLICATIONS

Ericsson, "Is UE AS slice agnostic or not?", 3GPP TSG-RAN WG2 #97bis; Tdoc R2-1702554; Spokane, WA (Apr. 3-7, 2017). (5 pages).
Nokia, "Solutions for for Network Slice Selection", 3GPP TSG-RAN WG3 Meeting #92; R3-161356; Nanjing, China (May 23-27, 2016). (6 pages)
Samsung, "Network slicing selection", 3GPP TSG-RAN WG3 Meeting #92; R3-161065; Nanjing, China (May 23-27, 2016). (3 pages)
3GPP TS 23.502 V0.3.0 (Mar. 2017); 3rd Generation Partnership Project; Technical Specification Group Services and System Aspects; Procedures for the 5G System; Stage 2 (Release 15) (Mar. 2017). (115 pages).
3GPP TS 23.502 V0.4.0 (May 2017); 3rd Generation Partnership Project; Technical Specification Group Services and System Aspects; Procedures for the 5G System; Stage 2 (Release 15) (May 2017). (126 pages).
3GPP TS 23.501 V0.4.0 (Apr. 2017); 3rd Generation Partnership Project; Technical Specification Group Services and System Aspects; System Architecture for the 5G System; Stage 2 (Release 15) (Apr. 2017). (124 pages).

\* cited by examiner

MAPPING OF S-NSSAI AT ROAMING

CROSS REFERENCE TO RELATED APPLICATION(S)

This application is a 35 U.S.C. § 371 National Stage of International Patent Application No. PCT/EP2018/065428, filed Jun. 12, 2018, designating the United States and claiming priority to U.S. provisional application No. 62/523,092, filed on Jun. 21, 2017. The above identified applications are incorporated by reference.

TECHNICAL FIELD

Disclosed are embodiments related to registering a user equipment (UE).

BACKGROUND

The Third Generation Partnership Project (3GPP) has begun on work on the development and design of the next generation mobile communications system (a.k.a., the 5G mobile communication system or the Next Generation (NG) system or simply "5G" or "NG" for short). 3GPP is currently in the process of specifying the 5G radio interface called New Radio (NR) or "G-UTRA" as well as a Next Generation Packet Core Network (NG-CN or NGC).

A user equipment (UE) (i.e., a device capable of wireless communication with a radio access network node, such as, for example, a smartphone, a laptop, a tablet, a smart sensor, an appliance, etc.) needs to register with a network in order to receive services which require registration. A registration procedure is utilized in the following situations: (1) when the UE initially registers to a 5G system; (2) when the UE initiates a registration procedure due to mobility, e.g. when the UE changes to a new Tracking Area (TA) in idle mode; (3) when the UE performs a periodic update due to expiration of a predefined time period of inactivity, etc.

As part of the 5G work in 3GPP, a network slice has been described as a logical network that provides specific network capabilities and network characteristics, and a network slice instance as a set of network function instances and the required resources (e.g. compute, storage and networking resources) which form a deployed network slice. Further details on network slicing are described in 3GPP TS 23.501, v1.0.0 (2017-06) "3rd Generation Partnership Project; Technical Specification Group Services and System Aspects; System Architecture for the 5G System; Stage 2" (Release 15) ("3GPP TS 23.501"), and specifically clause 5.15 Network Slicing.

By way of background:
Network slices may differ for supported features and network functions optimisations. The operator may deploy multiple Network Slice instances delivering exactly the same features but for different groups of UEs, e.g. as they deliver a different committed service and/or because they may be dedicated to a customer.
A single UE can simultaneously be served by one or more Network Slice instances via a 5G-AN. A single UE may be served by at most 8 Network Slices at a time. The AMF instance serving the UE logically belongs to each of the Network Slice instances serving the UE, i.e. this AMF instance is common to the Network Slice instances serving a UE.
(3GPP TS 23.501, clause 5.15.1).

A S-NSSAI (Single Network Slice Selection Assistance information) identifies a Network Slice, and a NSSAI is a list of S-NSSAIs. Further, as provided in 3GPP TS 23.501, clause 5.15.2.1:
The (R)AN may use Requested NSSAI in access stratum signalling to handle the UE Control Plane connection before the 5GC informs the (R)AN of the Allowed NSSAI. The Requested NSSAI is not used by the RAN for routing when the UE provides also a Temporary User ID.
. . .
When a UE is successfully registered, the CN informs the (R)AN by providing the whole Allowed NSSAI for the Control Plane aspects.

Each S-NSSAI may have a standardized value or a public land mobile network (PLMN) specific value. Where the S-NSSAI has a PLMN-specific value, the PLMN-specific value is associated to a PLMN ID of the PLMN that assigns it. (This construct may be similar to the existing parameter UE Usage Type from 3GPP Rel-13 and the 4G LTE access.)

Regarding the storage of NSSAI (collection of S-NSSAIs) in the UE, clause 5.15.4 of TS 23.501 gives the following:
A UE can be configured by the [home PLMN] HPLMN with a Configured NSSAI per PLMN. A Configured NSSAI can be PLMN-specific and the HPLMN indicates to what PLMN(s) each Configured NSSAI applies, including whether the Configured NSSAI applies to all PLMNs, i. e. the Configured NSSAI conveys the same information regardless of the PLMN the UE is accessing (e.g. this could be possible for NSSAIs containing only standardized S-NSSAIs). When providing a Requested NSSAI to the network upon registration, the UE in a given PLMN shall only use S-NSSAIs belonging to the Configured NSSAI, if any, of that PLMN. Upon successful completion of a UE's Registration procedure, the UE may obtain from the AMF an Allowed NSSAI for this PLMN, which may include one or more S-NSSAIs.
. . .
For each PLMN, the UE shall store the Configured NSSAI and, if any, the Allowed NSSAI. When the UE receives an Allowed NSSAI for a PLMN, it shall store it and override any previously stored Allowed NSSAI for this PLMN.

Particularly for roaming the TS 23.501 clause 5.15.6 stipulates that:
For roaming scenarios, the Network Slice specific network functions in VPLMN and HPLMN are selected based on the S-NSSAI provided by the UE during PDU connection establishment as following.
If a standardized S-NSSAI is used, then selections of slice specific NF instances are done by each PLMN based on the provided S-NSSAI;
Otherwise, the VPLMN maps the S-NSSAI of HPLMN to a S-NSSAI of VPLMN based on roaming agreement (including mapping to a default S-NSSAI of VPLMN). The selection of slice specific NF instance in VPLMN are done based on the S-NSSAI of VPLMN, and the selection of any slice specific NF instance in HPLMN are based on the S-NSSAI of HPLMN.

SUMMARY

A slice supporting UE making an initial registration (Attach) in a VPLMN (e.g., roaming) may request a set of network slices by providing the corresponding requested S-NSSAI (in an NSSAI). Based on configuration in the UE and any earlier received allowed S-NSSAIs for the VPLMN, the following variants of source for Requested S-NSSAI exist:

A. S-NSSAI configured for the hPLMN (e.g., the UE doesn't have any S-NSSAIs for the specific VPLMN, nor any configured default for any VPLMN);
B. S-NSSAI configured for use in the VPLMN (e.g., the UE either has S-NSSAIs configured for the specific VPLMN, or configured default S-NSSAIs for any VPLMN);
C. S-NSSAI provided by the VPLMN (e.g., the UE has at a previous registration in the VPLMN been provided with allowed S-NSSAs valid for the VPLMN at that time of registration).

However, regardless of case A-C, the requested S-NSSAIs provided by the UE may not be valid in the VPLMN (even for case C, as the VPLMN may have been reconfigured in between the visits). That is, the VPLMN may not be able to match the UE requested slice with a matching and available network slice. Moreover, even if the UE provides an S-NSSAI that is recognizable by the VPLMN (the same value is used by the VPLMN), the UE and the VPLMN (vNSSF or AMF) may not make the same interpretation of what slice (functions and services) are requested. For example, the S-NSSAI values requested by the UE may be values that are not standardized or not known as part of a roaming agreement.

Thus, for the VPLMN to be able to interpret what slices are requested by the UE, there is a need in the VPLMN to have a mapping or association between a requested S-NSSAI and the S-NSSAI to be used in the visited PLMN (vS-NSSAI). For home routed traffic there is also a need to have a mapping or association between a requested S-NSSAI and an S-NSSAI to be used in the home PLMN (hS-NSSAI). The latter mapping could be performed either entirely in the VPLMN or with help from the hPLMN (e.g. via an vNSSF to hNSSF interface).

For a pre-configured mapping in the VPLMN, in order to derive vS-NSSAIs, the VPLMN must as input (directly or indirectly) use S-NSSAIs that are known by the VPLMN (i.e. pre-configured in the VPLMN). For a roamer situation, the only S-NSSAIs that are possibly known beforehand by the network are those that are used in the home network, i.e. those present in subscription data. This means that the VPLMN will have to make a correlation between a requested S-NSSAI and the corresponding S-NSSAI from the subscription. This is particularly clear when considering mapping between a requested S-NSSAI for home routing and hS-NSSAI from subscription data, as hS-NSSAIs are values matching a use in the home network. The chain of getting a vS-NSSAI would then look like:

From UE requested S-NSSAI→matched with hS-NSSAI from subscription→vS-NSSAI to be applied in the visited network,
where the hS-NSSAI→vS-NSSAI mapping is pre-configured in a VPLMN based e.g. on a Service Level Agreement, SLA.

However, there is no UE specific configuration information in the VPLMN for roaming UEs, nor any more information from the UDM, so the necessary mapping information must come from the UE. The only common NSSAI denominator between a UE and a VPLMN is the list of subscribed S-NSSAI. By assigning each subscribed S-NSSAI a slice index (e.g. the ordinal number in the subscription) and also providing that to the UE (each hS-NSSAI in the UE is provided with its slice index) it will be possible for the UE to associate a Requested S-NSSAI with a corresponding slice index and provide that in communication with the CN, thus making it possible for the CN to correlate the requested S-NSSAI with a subscribed S-NSSAI. A Requested S-NSSAI represents a set of wanted functions and services and in the home network this is represented by a subscribed S-NSSAI (an hS-NSSAI) and thus also a slice index.

When the CN gets the slice index for a Requested S-NSSAI it will be possible via subscription data to map the Requested S-NSSAI to a subscribed S-NSSAI (hS-NSSAI), to be used for home routed traffic, and further on map to a vS-NSSAI to be used in the VPLMN.

A UE that supports slicing shall at least be pre-configured with the subscribed S-NSSAIs (i.e. the hS-NSSAIs) and their corresponding slice index. The UE may also have been configured with S-NSSAIs/Slice index to be used in VPLMN(s). At update of the subscription (subscribed S-NSSAIs and/or slice index) also the UE shall be updated thus keeping the subscription profile and the UE synchronized. In a roaming situation, the UE will in the accept message be provided by the VPLMN with a set of Allowed S-NSSAI (i.e. the vS-NSSAI(s)) and their corresponding slice index. Together with the pre-configured data this is enough for the UE to be able to make an association between a vS-NSSAI, the hS-NSSAI and the slice index.

For the UE to be able to provide a Requested S-NSSAI corresponding to the need of the application to be used, it is also necessary to have a mapping between the application and the slice(s) to use. By using a Network Slice Selection Profile, NSSP, provided by the home network the UE gets the necessary association between a wanted application and a subscribed S-NSSAI (slice). The chain of getting a Requested S-NSSAI at roaming, would then look like:

Application→NSSP→Subscribed S-NSSAI (hS-NSSAI) →Slice index→Requested S-NSSAI where the Requested S-NSSAI may be of source A, B or C as described in clause 2.2.

At a subsequent registration attempt in a VPLMN the UE provides on RRC-level the vS-NSSAI(s) for the VPLMN, corresponding to slice(s) the UE wants to use. This will enable the AMF selection by the RAN.

At NAS-level the UE provides the slice index(es) and the vS-NSSAI(s) for the VPLMN, corresponding to slice(s) the UE wants to use. This will enable vSMF and hSMF selection by the AMF. The vS-NSSAI(s) enable the CN to validate that the UE is using the correct set of vS-NSSAI at RRC level.

Without a mapping between subscribed S-NSSAIs and vS-NSSAIs rerouting due to slicing becomes more frequent. Selection of hS-NSSAI to be used for home routed traffic at roaming will not be possible at all occasions.

BRIEF DESCRIPTION OF THE DRAWINGS

The accompanying drawings, which are incorporated herein and form part of the specification, illustrate various embodiments.

DETAILED DESCRIPTION

Figure 1:
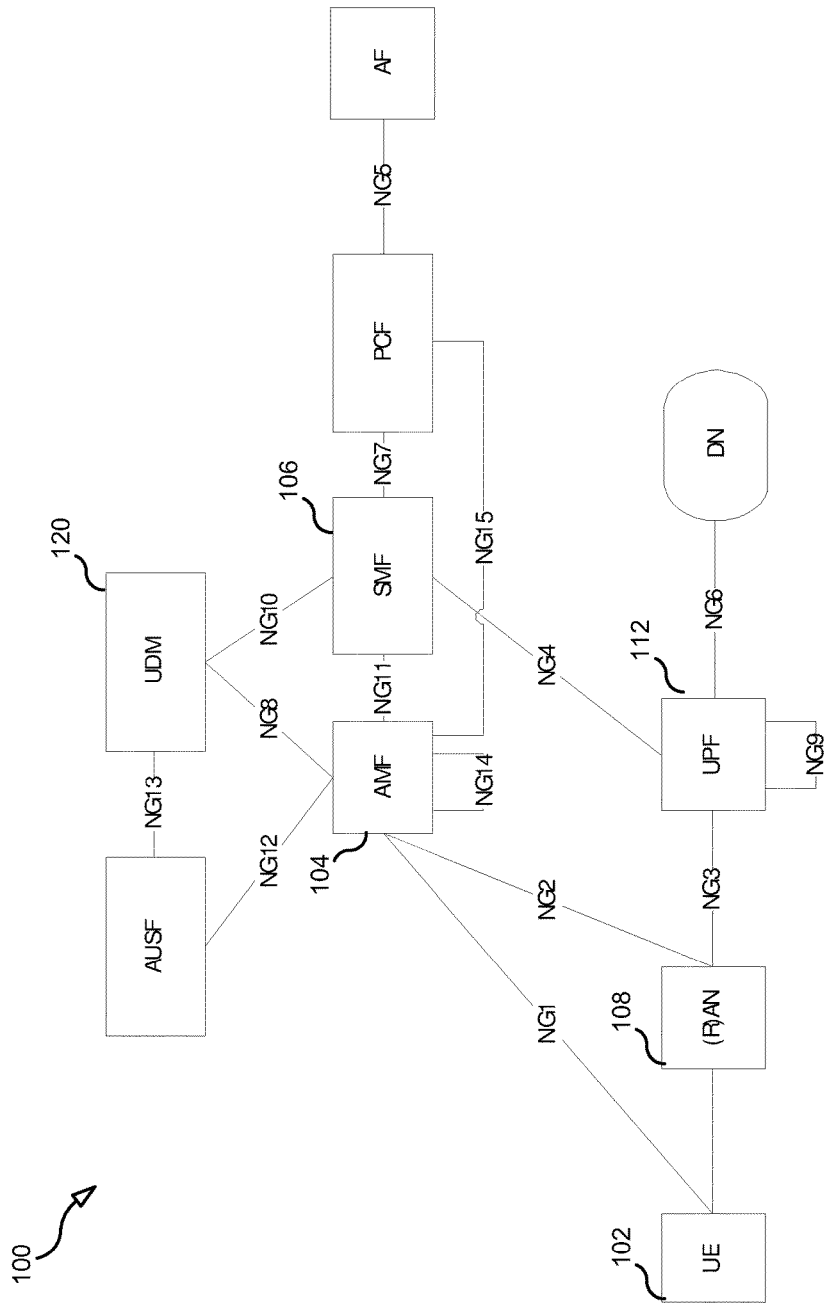
FIG. 1 illustrates an exemplary Next Generation (NG) communication structure.

As mentioned above, UE 102 needs to register with the network to receive services that require registration. Referring now to FIG. 1, FIG. 1 illustrates an exemplary 5G communication system 100. The 5G communication system 100 illustrates a point to point reference point representation. As shown in FIG. 1, a UE 102 communicates with an access network (AN) 108 (e.g., a radio AN ((R)AN)), which communicates with an AMF 104, which communicates with other core network functions, such as UDM 120.

As described above, UE 102 initiates a registration procedure is in the following situations: (1) when the UE 102 initially registers to a 5G system; (2) when the UE 102 initiates a registration procedure due to mobility, e.g. when the UE 102 changes to a new registration area (e.g. a new Tracking Area (TA)) in idle mode; (3) when the UE 102 performs a periodic update due to expiration of a predefined time period of inactivity, etc.

Figure 2:
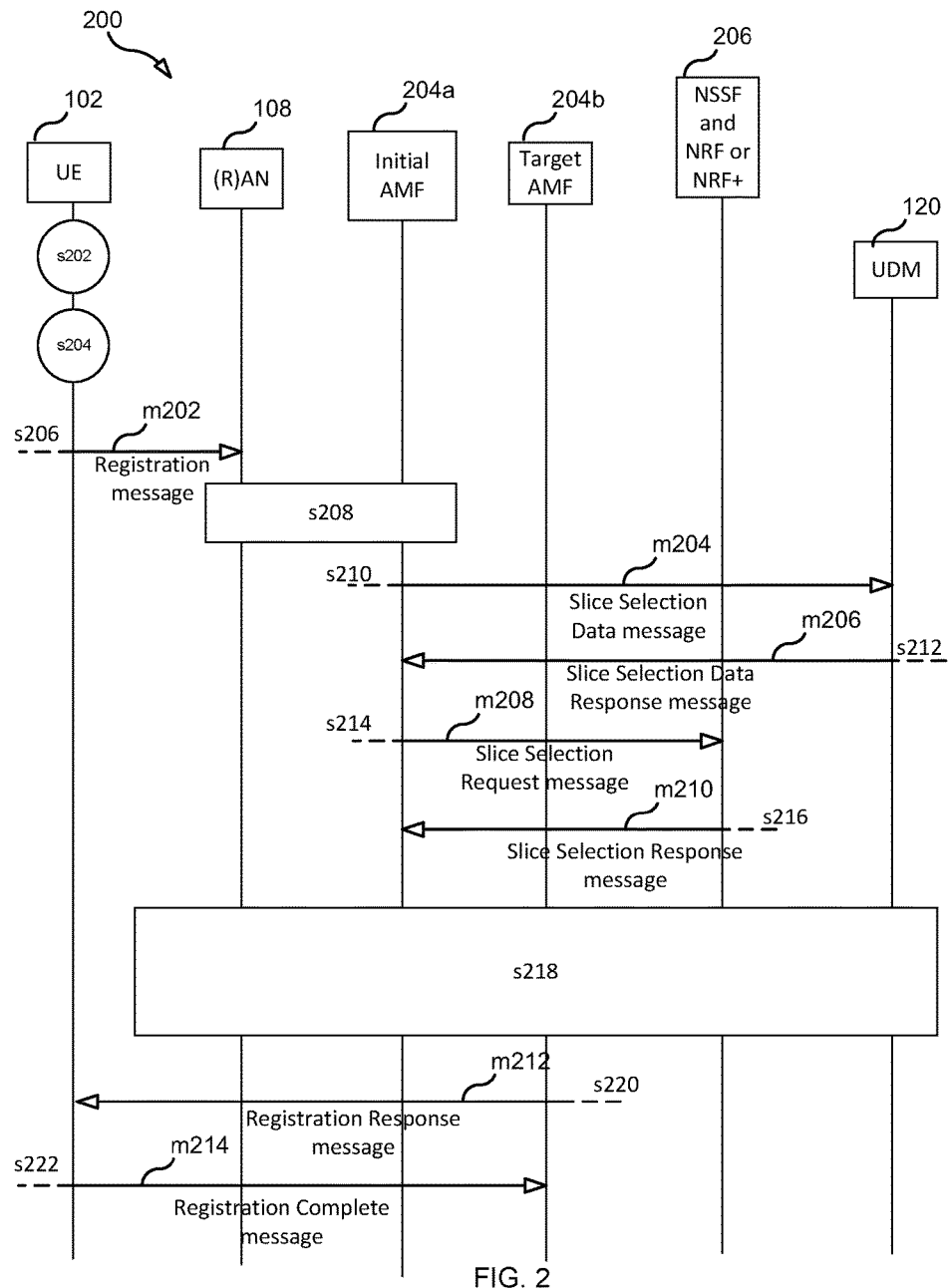
FIG. 2 is a message flow diagram illustrating a registration procedure according to some embodiments.

FIG. 2 is a message flow diagram illustrating a registration process 200.

In step s202, the slice supporting UE 102 is pre-configured with subscribed S-NSSAIs and corresponding slice indexes. A subscribed S-NSSAI is also known as a "home" S-NSSAI (hS-NSSAI). Preferably, the UE is always provided with a list of pairs [hS-NSSAI, index] matching its subscription data. In some embodiments, the UE configuration of value pairs [hS-NSSAI, slice index value] is synchronized with the subscription data [hS-NSSAI, index]. For example, the core node that handles the subscription data (e.g., the UDM) and the UE may both be provided with the same set of value pairs [S-NSSAI, index]. In step s202, the UE optionally may also be configured with S-NSSAIs to be used in visited PLMN(s) (VPLMNs). In some instances, the S-NS SAIs to be used in VPLMNs are default values (dS-NSSAI), or generic identities of S-NSSAI that are applicable for the UE to use in a roaming scenario when the UE has no PLMN-specific list of value pairs. In some embodiments, the UE may also be provided with a list of value pairs [vS-NSSAI, index value] from a previously visited VPLMN, such as described below in connection with step s220 and message m212.

In some embodiments, the S-NSSAI configuration information may be a lookup table, the lookup table including a set of one or more tuples, each tuple including a S-NSSAI and a slice index corresponding to the S-NSSAI. For example, the lookup table for the home network configuration data may include tuples with a hS-NSSAI and a slice index corresponding to the hS-NSSAI, wherein the default visited network configuration data may include tuples with a dS-NSSAI and a slice index corresponding to the dS-NSSAI.

Referring now to a specific example, in step s202, the UE 102 is pre-configured with 10 hS-NSSAIs, A-J, and corresponding slice index 1-10 (e.g., (hS-NSSAIs, slice index): (A, 1), (B, 2) . . . (J, 10)). The UE is also preconfigured with the following 2 dS-NSSIAs and corresponding slice index to be used in any not yet visited PLMN (VPLMN) (dS-NSSAI, slice index): (β, 2), (γ, 3). β and γ could be based on standardized SST values (S-NSSAI=SST+SD, see 3G TS 23.501), and therefore suited as default for a VPLMN. In this example, the UE does not have any value pairs [vS-NSSAI, slice index] for the VPLMN to which it is registering. Thus, slices B and C in the home PLMN (hPLMN) with index values 2 and 3, respectively, may correspond (i.e., "correspond" based on matching slice index values) to slices β and γ, with index values 2 and 3 respectively. However, it may be better to use B and C in a non-roaming scenario because slices B and C may not necessarily be equivalent to slices β and γ.

In step s204, via the hPLMN, the UE has either previously been provided with a Network Slice Selection Profile, or is via the VPLMN provided with a Network Slice Selection Profile, giving the UE a configuration for use to map between an application request of network resources and the control signaling by the UE in a hPLMN to request slice resources (hS-NNSAI). Continuing with the example, we may assume that Network Slice Selection Profile indicates that in order to run the necessary application(s), the UE needs slices B and C in the home PLMN with corresponding slice indexes 2 and 3, respectively.

In step s206, the UE requests network slices for desired applications in registration message m202. Registration message m202 may include a requested S-NSSAI (rS-NSSAI) and an associated slice index. For example, registration message m202 includes a list of slice resources (rS-NSSAI, slice index) needed to serve the desired applications. The UE may select the rS-NSSAI for the list based on its stored information of value pairs [S-NSSAI, slice index] and what the UE determines to be a best fit of information for the specific VPLMN. For example, the UE may first obtain a slice index based on the necessary hS-NSSAI values required for the application, and use the slice index to select a rS-NSSAI. If the UE has stored information of value pairs [vS-NSSAI, slice index] for the specific VPLMN, the UE should first try to select as the rS-NSSAI any vS-NSSAI corresponding to the slice index (es) associated with the necessary hS-NSSAI. Using the vS-NSSAI values is preferred since they have been provided by the PLMN itself. If the UE cannot match a slice index to a vS-NSSAI, the UE may next try to select as the rS-NSSAI any dS-NSSAI (S-NSSAI with default values for a visiting network) corresponding to the slice index(es) associated with the necessary hS-NSSAI. As a last resort, the UE may simply use the hS-NSSAI and the corresponding slice index (es). Using the hS-NSSAI values may still be useful since the VPLM may be able to make a comparison with subscription data and a roaming agreement, as described below.

Continuing with the example for step s206, the UE first translates what the applications need to the corresponding hPLMN slices hS-NSSAI—in this case hS-NSSAI B and C with slice indexes 2 and 3, respectively. Since the UE in this example is requesting resources in a VPLMN for which it does not yet have any VPLMN specific information (vS-NSSAI), and the UE is aware that it is requesting resources in a VPLMN and not in the HPLMN, the UE includes in registration message m202 as Requested S-NSSAI and corresponding slice index the VPLMN generic value pairs (β, 2) and (γ, 3). At the RRC-level, the UE provides β and γ, but since these VPLMN generic slices are not supported by the specific VPLMN (see s216), the RAN routes the unknown UE slice request to a default AMF, i.e. the Initial AMF 204a.

In step s208, parts of a general registration procedure may optionally be performed. For example, steps 4-9a of FIG. 4.2.2.2.2-1 of clause 4.2.2.2.2 General Registration in 3GPP TS 23.502, v.0.4.0 (2017-06) "3$^{rd}$ Generation Partnership Project; Technical Specification Group Services and System Aspects; Procedures for the 5G System; Stage 2" (Release 150 ("3GPP TS 23.502"), which is hereby incorporated by reference, may be performed.

In the steps that follow (e.g., steps s210-s216), after receiving the requested network slices (rS-NSSAI, slice index), the VPLMN identifies any entries that match the VPLMN native pairs of [vS-NSSAI, index]. Since these requested network slices are native to the VPLMN, they will be served so long as they are part of a roaming agreement for the UE. The VPLMN verifies the roaming agreement by retrieving subscription data with its list of value pairs [hS-NSSAI, index] (this could be a subset of subscribed S-NSSAIs (e.g., the S-NSSAIs that are ok to use in the VPLMN). While the two operators, the HPLMN and the VPLMN may have configured the values of hS-NSSAI and vS-NSSAI differently, the different configuration is not an issue because the VPLMN may instead use the associated index value in the comparison. For example, the VPLMN may instead attempt to match the index of a requested value [rS-NSSAI, index] with an index of the subscribed value pairs [hS-NSSAI, index]. Matches that are supported by a roaming agreement may be filtered out as served or allowed S-NSSAI (aS-NSSAI).

In step s210, the initial AMF transmits a slice selection data message m204 towards a UDM. Message m204 may include a Subscriber Permanent Identifier (SUPI), e.g. the IMSI.

In step s212, in response to message m204, the UDM transmits a slice selection data response message m206 towards the initial AMF. The slice selection data response message m204 may provide a list of one or more subscribed hS-NSSAI and corresponding slice indexes.

In step s214, the initial AMF transmits a slice selection request message m208 towards the NSSF and NRF 206 (or NRF+206 in the case where the NSSF and NRF are combined in an NRF+). The slice selection request message m208 may comprise two lists. The first list may include a list of one or more requested S-NSSAI and associated slice index (e.g., included in registration message 202), and the second list may include a list of one or more subscribed hS-NSSAI and associated slice index (e.g., included in the slice selection data response message m204).

In step s216, the NRF+ transmits a slice selection response message m210 towards the initial AMF. The slice selection response message m210 may include a set of selected allowed S-NSSAI to be used in VPLMN (i.e. the vS-NSSAIs or aS-NSSAIs) and corresponding hS-NSSAIs (to be used at SMF selection for home routed traffic), as well as corresponding slice indexes. By comparing the index values of the received [rS-NSSAI, slice index] and the received [hS-NSSAI, slice index] value pairs, the VPLMN may determine which rS-NSSAI the UE is subscribed, based on, for example, a service level agreement between a visited and home network. Continuing with the example, the NSSF/NRF may provide in message m210 (allowed vS-NSSAI, slice index): (ii, 2) and (iii, 3). Since the VPLMN didn't support the generic vS-NSSAIs β and γ, these requested slices were mapped in the NSSF, using the associated slice index values, to the vS-NSSAIs ii and iii based on configuration data in the NSSF. That is, in this example, configuration data in the NSSF mapped vS-NSSAI ii to slice index value 2 and mapped vS-NSSAI iii to slice index value 3, and, therefore, NSSF selected vS-NSSAIs ii and iii as the allowed vS-NSSAIs because vS-NSSAIs ii and iii are paired with the requested slice index values (i.e., slice indexes 2 and 3). The configuration data may include, for example, a service level agreement between a visited and a home operator.

Figure 4:
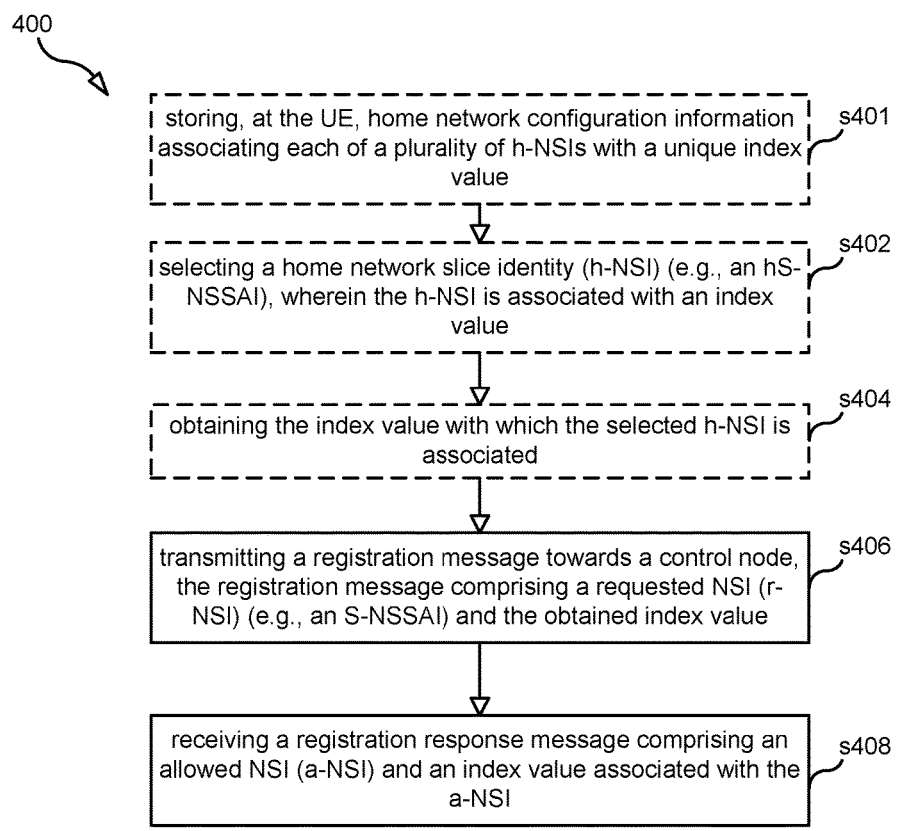
FIG. 4 is a flow chart illustrating a process according to some embodiments.

In step s218, a registration with AMF relocation procedure and/or registration procedure described in 3GPP TS 23.502, clauses 4.2.2.2.3 and 4.2.2.2.2 may be performed (e.g., steps 5a-8 of FIG. 4.2.2.2.3-1 and steps 11-21 of FIG. 4.2.2.2.2-1).

In step s220, a Target AMF 204b transmits a Registration Response/Accept message m212 towards the UE. The registration response message may include a list of Allowed S-NSSAIs in the VPLMN (i.e. aS-NSSAIs) and corresponding slice indexes. This will enable the UE to populate a list of S-NSSAI and slice index, which may be stored in the UE and used for this particular VPLMN at a later registration attempt in the VPLMN. For example, the UE may not be able to identify all aS-NSSAIs because they are local to the VPLMN, but the UE may be able to use the associated slice index value to enable the UE to correlate with the request and store the information for later use.

In step s222, the UE transmits a registration complete message m214 towards the target AMF to acknowledge if a new 5G-GUTI was assigned.

Additional Example:

a) The UE requests [vS-NSSAI="qwx," index=1], [hS-NSSAI="DEF," index=2]. That is the registration message includes: [vS-NSSAI="qwx," index=1], [hS-NSSAI="DEF," index=2].

b) The VPLMN (e.g., AMF 204a) retrieves subscription data for the UE (e.g., s210, m204). The retrieved subscription data includes [hS-NSSAI="ABC," index=1], [hS-NSSAI="DEF," index=2].

c) The VPLMN identifies the UE as a roamer from a PLMN with which it has a roaming agreement for index=1 and index=2 (e.g., s214, m208). The VPLMN is deployed and configured with [vS-NSSAI="qwx", index=1], [vS-NSSAI="zpk," index=2].

d) The VPLMN identifies "qwx" as a VPLMN S-NSSAI. The VPLMN takes the index=1 received with "qwx," compares it with the UE subscription, and finds a match=>the request is allowed per subscription. The VPLMN compares the index value with roaming agreements, and finds a match for index=1=>the request is allowed per roaming agreement.

e) The VPLMN admits access to slice "qwx" (e.g., s216, m210)

f) The VPLMN identifies "DEF" as an unknown identifier S-NSSAI. The VPLMN take the index=2 received with "DEF," compare it with UE subscription data, and finds a match=>the request is allowed per subscription The VPLMN compares the index value with roaming agreements and find a match for index=2=>the request is allowed per roaming agreement.

g) The VPLMN admit access to slice "zpk", the native VPLMN S-NSSAI value matching the admitted index=2.

h) The VPLMN responds to the UE with the admitted values: ["qwx", index=1], ["zpk", index=2]

i) The UE compares the received information with the information included in the previously sent request. The UE identifies that it is admitted to use the S-NSSAI="qwx" as requested. The UE identifies that it is admitted to use the S-NSSAI="zpk" which was not requested but which has an index=2, which was requested. The UE then knows that the admitted S-NSSAI="zpk" shall be used in the VPLMN as a replacement/equivalent for the HPLMN S-NSSAI value of "DEF." Hence, the UE may update its configuration information to add the following tuple to the configuration information for the specific VPLMN: [S-NSSAI="zpk", index=2].

Figure 3:
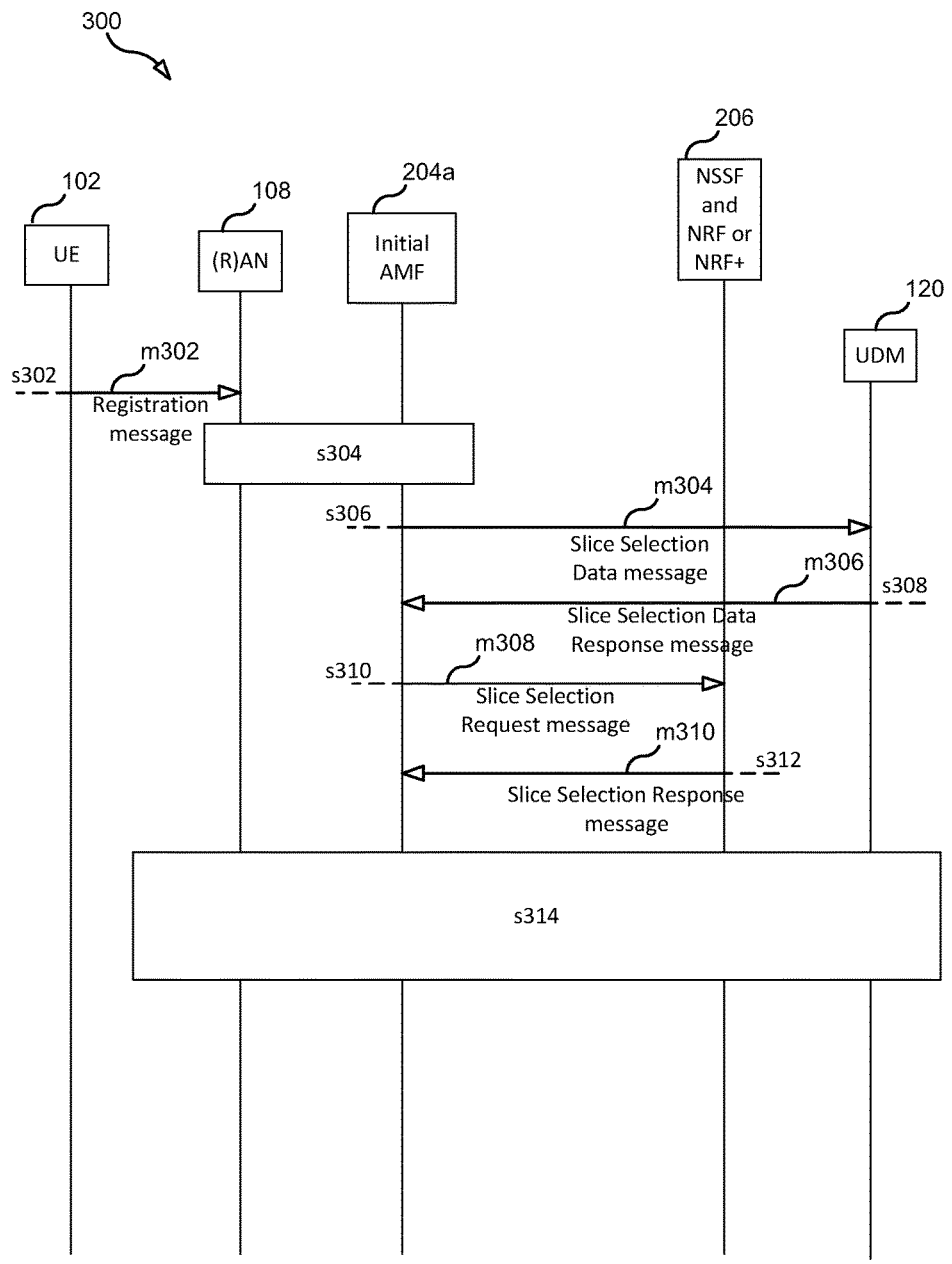
FIG. 3 is a message flow diagram illustrating a registration procedure according to some embodiments.

FIG. 3 is a message flow diagram illustrating a registration procedure 300 according to some embodiments. Continuing with the example used in FIG. 2, we may assume that the UE and the VPLMN is the same as in FIG. 2, and that the UE has already been: configured with S-NSSAI and corresponding slice information (step s202 of FIG. 2), provided a mapping between an application and the hS-NSSAI to use for that application (step s204 of FIG. 2), and received allowed vS-NSSAI and associated slice index (step s220, message 212 of FIG. 2) for the VPLMN.

In step s302, the UE transmits a registration message m302 towards the (R)AN. As with registration message m202 discussed above, registration message m302 may include a requested S-NSSAI and an associated slice index. Continuing with the example, since the UE had previously been registered in the VPLMN and received registration response message m212 with a list of allowed vS-NSSAI and associated slice indexes (see FIG. 2), the UE may thereby include in registration message m303 requested S-NSSAI slices that are supported by the VPLMN and the associated slice indexes. Specifically, since the UE wants to use applications corresponding to hS-NSSAI B and C with slice index 2 and 3 respectively, the UE includes in message m302 as Requested S-NSSAI and corresponding slice index (ii, 2) and (iii, 3) based on values in its S-NSSAI table for this specific VPLMN. At the RRC-level the UE provides ii and iii. Since these slices are supported by the VPLMN, the RAN routes the UE request to an AMF supporting these slices, in this case the initial AMF (which may not necessarily be in the same AMF in FIG. 2).

Step s304, which may be optional, is the same as step s208 described above in connection with FIG. 2.

In step s306, the initial AMF transmits a slice selection data message m304 towards the UDM. Similar to slice selection data message m204, the slice selection data message m304 may include a Subscriber Permanent Identifier (SUPI), e.g. the IMSI.

In step s308, the UDM transmits a slice selection data response message m306 towards the initial AMF. Similar to slice selection data response message m206, slice selection data response message m306 may include a list of subscribed hS-NSSAI and corresponding slice indexes.

In step s310, the initial AMF transmits a slice selection request message m308 towards the NSSF and NRF (or the NRF+, if the NSSF and NRF are combined in an NRF+). Similar to slice selection request message m208, slice selection request message m308 may comprise two lists. The first list may include a list of any requested S-NSSAI and associated slice index (e.g., included in registration message m302), and the second list may include a list of any subscribed hS-NSSAI and associated slice index (e.g., included in the slice selection data response message m304).

In step s312, the NSSF and NRF or NRF+ transmits a slice selection response message m310 towards the initial AMF. Similar to message m210, the slice selection response message m310 may comprise a list of allowed vS-NSSAI and associated slice index. In this example, message m310 includes (Allowed vS-NSSAI, slice index): (ii, 2) and (iii, 3).

In step s314, a registration with AMF relocation procedure and/or registration procedure described in 3GPP TS 23.502, clauses 4.2.2.2.3 and 4.2.2.2.2 may be performed (e.g., steps 5a-8 of FIG. 4.2.2.2.3-1 and steps 11-21 of FIG. 4.2.2.2.2-1).

Since in this example the Initial AMF supports the requested slices, reroute is not necessary. The UE is accepted by the initial AMF, and the Registration Accept messages will as in FIG. 2 include a list of Allowed S-NSSAIs in the VPLMN (i.e. vS-NSSAIs) and corresponding slice indexes.

FIG. 4 is a flow chart illustrating a process 400 according to some embodiments. In some embodiments, process 400 begins with an optional step s401 in which the UE stores home network configuration information associating each of a plurality of home network slice identities (h-NSIs) (e.g., hS-NSSAIs) with an index value (e.g., a unique index value). For example, in some embodiments, the home network configuration information may include a first h-NSI associated with a first index value and a second h-NSI associated with a second index value (e.g., a one to one association between an h-NSI and an index value). In some embodiments, the home network configuration information may include a first h-NSI associated with a first index value and a second h-NSI associated with the first index value (e.g., a many to one association between several h-NSIs and the same index value). For example, as described above in connection with step s202 of FIG. 2, the slice supporting UE may be pre-configured with subscribed S-NSSAIs and corresponding slice indexes.

In optional step s402, the UE selects an h-SNI (e.g., an hS-NSSAI), which is associated with an index value. In some embodiments, selecting an h-NSI comprises identifying a desired application and using application configuration information to select an h-NSI with which the identified application is associated. For example, as described above in connection with step s204 of FIG. 2, the UE may have been provided with a Network Slice Selection Profile (NSSP), and the application configuration information may be the NSSP.

In optional step s404, the UE obtains the index value with which the selected h-NSI is associated. In some embodiments, obtaining an index value with which the selected h-NSI is associated comprises using the home network configuration (e.g., as described in connection with step s401) to obtain the index value with which the selected h-NSI is associated. In some embodiments, obtaining the index value may include the steps of: finding the selected h-NSI in a lookup table, and obtaining the index value associated with the selected h-NSI from the lookup table. The lookup table may include a set of one or more home network configuration tuples, each home network configuration tuple comprising an h-NSI and a slice index corresponding to the h-NSI.

In step s406, the UE transmits a registration message towards a control node, the registration message comprising a requested NSI (r-NSI, or S-NSSAI) and the obtained index value. In some embodiments, the control node comprises an AMF of a home network. For example, as described above in connection with FIGS. 2 and 3, the registration message may be message m202 or m303, respectively, which may include a list of one or more rS-NSSAIs and the associated slice index value.

In some embodiments, the UE selects the r-NSI based on the obtained index value with which the selected h-NSI is associated. For example, as described above, the r-NSI may be: (A) a visited-NSI value (e.g., a vS-NSSAI obtained from the VPLMN from an earlier registration and subsequently stored in the UE) having an associated index value equal to the index value with which the h-NSI is associated, (B) a default d-NSI value for a not yet visited PLMN (e.g., default vS-NSSAI configuration information for visited networks obtained in step s202 described above in connection with FIG. 2) having an associated index value equal to the index value with which the h-NSI is associated, or (C) as a last resort, the h-NSI value (e.g., when the UE does not have a v-NSI or d-NSI value associated with the index value).

Thus, in some embodiments, process 400 further comprises the step of storing, at the UE, a set of one or more visited NSIs (v-NSIs), wherein the v-NSIs are associated with the visited network. For example, the v-NSIs may be the allowed NSIs obtained from an earlier registration (e.g., message m212 described above in connection with FIG. 2). The step of selecting the r-NSI based on the index value with which the selected h-NSI is associated may include the step of determining that the set of v-NSIs includes a v-NSI that is associated with the index value with which the selected h-NSI is associated and selecting as the r-NSI the v-NSI that is associated with the index value.

In some embodiments, process 400 further comprises the step of storing, at the UE, a set of one or more default NSIs (d-NSIs), and the UE selecting the r-NSI based on the index value with which the selected h-NSI is associated comprises determining that the set of d-NSIs includes a d-NSI that is associated with the index value with which the selected h-NSI is associated, and selecting as the r-NSI the d-NSI that is associated with the index value. In some embodiments, the set of d-NSIs is associated with a specific visited network or the set of d-NSIs are for use with any visited network (e.g., standard or default). For example, as described above in connection with FIG. 2, step s202, the UE may be configured with standard or default S-NSSAIs to be used in a not yet visited PLMN(s) (VPLMNs). As another example, the UE may be configured with default vS-NSSAI values for a specific VPLMN.

In step s408, the UE receives a registration response message comprising an allowed NSI (a-NSI) and an index value associated with the a-NSI. In some embodiments, the a-NSI is different than the r-NSI and the index value associated with the a-NSI is equal to the obtained index value included in the registration message. For example, as described above in connection with FIG. 2, while the UE included a rS-NSSAI "13" (e.g., default or standard S-NSSAI value for a VPLMN) in registration message m202, the UE received an aS-NSSAI "ii" in message m212, where both "13" and "ii" have the same index value of 2. In some embodiments, process 400 further comprises a step of the UE updating locally stored configuration information for the visited network such that the updated locally stored configuration information for the visited network associates the a-NSI with the determined index value. In some embodiments, the registration response message is received from a target AMF in the visited network.

Figure 5:
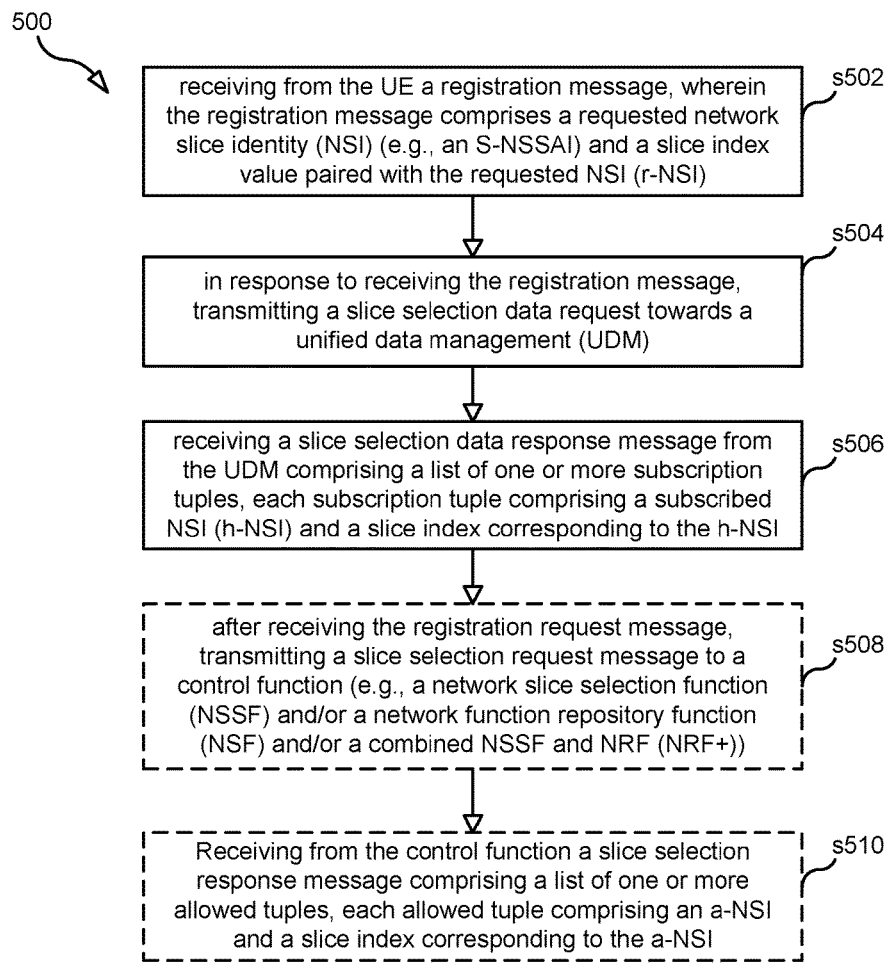
FIG. 5 is a flow chart illustrating a process according to some embodiments.

FIG. 5 is a flow chart illustrating a process 500 according to some embodiments. In some embodiments, process 500 begins with step s501 in which a core network node (e.g., AMF 104) (a.k.a., "control node") receives from the UE a registration message, wherein the registration message comprises a requested network slice identity (NSI) and a slice index value paired with the requested NSI (r-NSI). For example, the registration message may be message m202 or m302 described above in connection with FIGS. 2-3.

In step s504, in response to receiving the registration message, the control node transmits a slice selection data request towards a unified data management (UDM). For example, the slice selection data request may be message m204 or m304 described above in connection with FIGS. 2-3.

In step s506, the control node receives a slice selection data response message from the UDM comprising a list of one or more subscription tuples, each subscription tuple comprising a subscribed NSI (h-NSI) and a slice index corresponding to the h-NSI. For example, the slice selection data response message may be message m206 or m306 described above in connection with FIGS. 2-3.

In optional step s508, after receiving the registration request message, the control node transmits a slice selection request message to a control function (e.g., a network slice selection function NSSF) and/or a network function repository function (NSF) and/or a combined NSSF and NRF (NRF+). In some embodiments, the slice selection request message comprises a first list of one or more requested tuples, each requested tuple comprising an r-NSI and a slice index corresponding to the r-NSI, and a second list of one or more subscription tuples. For example, the slice selection request message may be message m208 or m308 described above in connection with FIGS. 2-3.

In optional step s510, the control node receives from the control function a slice selection response message comprising a list of one or more allowed tuples, each allowed tuple comprising an a-NSI and a slice index corresponding to the a-NSI. For example, the slice selection response message may be message m210 or m310 described above in connection with FIGS. 2-3.

Figure 6:
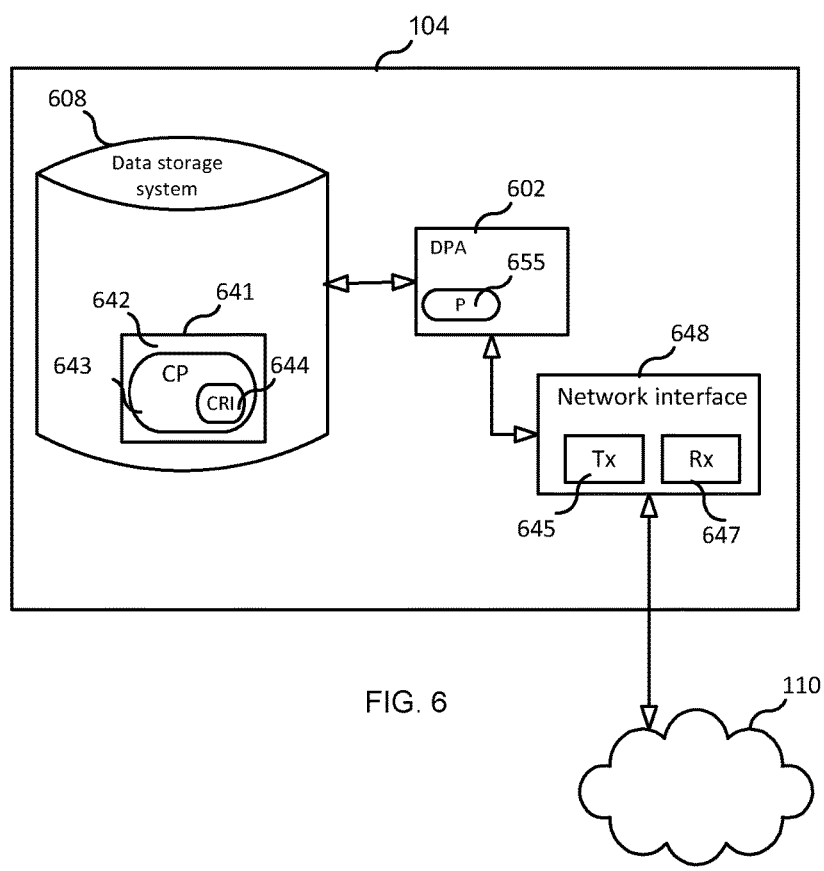
FIG. 6 is a block diagram of a control node according to some embodiments.

FIG. 6 is a block diagram of a control node (e.g., AMF 104) according to some embodiments. As shown in FIG. 6, the control node may comprise: a data processing apparatus (DPA) 602, which may include one or more processors (P) 655 (e.g., a general purpose microprocessor and/or one or more other processors, such as an application specific integrated circuit (ASIC), field-programmable gate arrays (FPGAs), and the like); a network interface 648 comprising a transmitter (Tx) 645 and a receiver (Rx) 647 for enabling the network node to transmit data to and receive data from other nodes connected to network 110 (e.g., an Internet Protocol (IP) network) to which network interface 648 is connected; and local storage unit (a.k.a., "data storage system") 608, which may include one or more non-volatile storage devices and/or one or more volatile storage devices (e.g., random access memory (RAM)). In embodiments where DPA 602 includes a general purpose microprocessor, a computer program product (CPP) 641 may be provided. CPP 641 includes a computer readable medium (CRM) 642 storing a computer program (CP) 643 comprising computer readable instructions (CRI) 644. CRM 642 may be a non-transitory computer readable medium, such as, but not limited to, magnetic media (e.g., a hard disk), optical media, memory devices (e.g., random access memory), and the like. In some embodiments, the CRI 644 of computer program 643 is configured such that when executed by data processing apparatus 602, the CRI causes the control node to perform steps described herein (e.g., steps described herein with reference to the flow charts and/or message flow diagrams). In other embodiments, control node may be configured to perform steps described herein without the need for code. That is, for example, DPA 602 may consist merely of one or more ASICs. Hence, the features of the embodiments described herein may be implemented in hardware and/or software.

Figure 7:
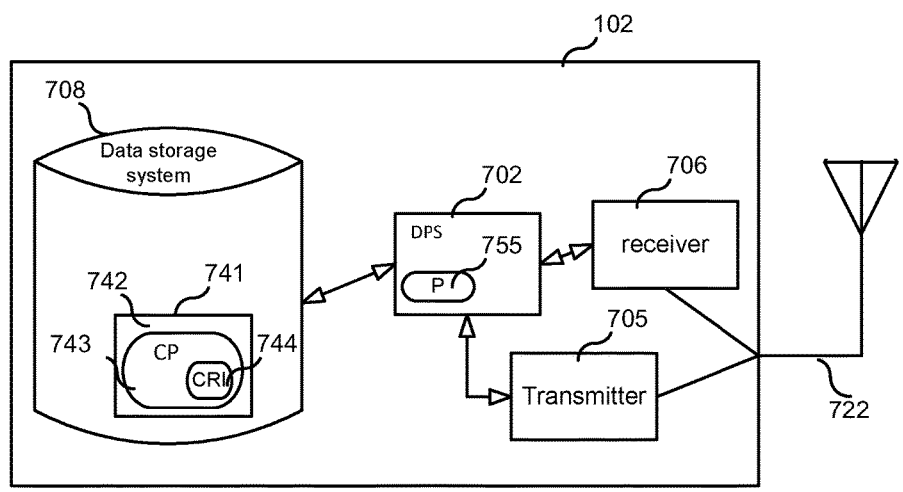
FIG. 7 is a block diagram of a UE according to some embodiments.

FIG. 7 is a block diagram of UE 102 according to some embodiments. As shown in FIG. 7, the UE may comprise: a data processing system (DPS) 702, which may include one or more processors 755 (e.g., a general purpose microprocessor and/or one or more other processors, such as an application specific integrated circuit (ASIC), field-programmable gate arrays (FPGAs), and the like); a radio transmitter 705 and a radio receiver 706 coupled to an antenna 722 for use in wirelessly communicating with a access network (AN) node (e.g., base station); and local storage unit (a.k.a., "data storage system") 708, which may include one or more non-volatile storage devices and/or one or more volatile storage devices (e.g., random access memory (RAM)). In embodiments where the UE includes a general purpose microprocessor, a computer program product (CPP) 741 may be provided. CPP 741 includes a computer readable medium (CRM) 742 storing a computer program (CP) 743 comprising computer readable instructions (CRI) 744. CRM 742 may be a non-transitory computer readable medium, such as, but not limited to magnetic media (e.g., a hard disk), optical media (e.g., a DVD), memory devices (e.g., random access memory), and the like. In some embodiments, the CRI 744 of computer program 743 is configured such that when executed by data processing system 702, the CRI causes the UE to perform steps described above (e.g., steps described above with reference to the flow charts). In other embodiments, the UE may be configured to perform steps described herein without the need for code. That is, for example, data processing system 702 may consist merely of one or more ASICs. Hence, the features of the embodiments described herein may be implemented in hardware and/or software.

Figure 8:
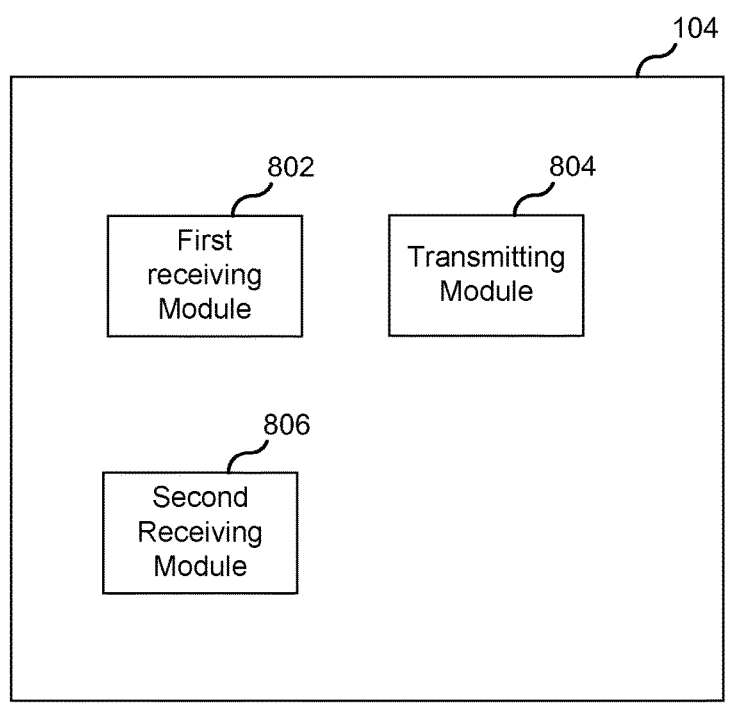
FIG. 8 is a diagram showing functional modules of a control node according to some embodiments.

FIG. 8 is a diagram showing functional modules of a control node according to some embodiments. As shown in FIG. 8, the control node includes: a first receiving module (802) operable to receive from the UE a registration message, wherein the registration message comprises a requested network slice identity (NSI) (e.g., an S-NSSAI) and a slice index value paired with the requested NSI (r-NSI). The control node further includes a transmitting module (804) configured to employ a transmitter to transmit a slice selection data request towards a unified data management (UDM) in response to the control node receiving the registration message. The control node further includes a second receiving module (806) operable to receive a slice selection data response message from the UDM comprising a list of one or more subscription tuples, each subscription tuple comprising a subscribed NSI (h-NSI) and a slice index corresponding to the h-NSI.

Figure 9:
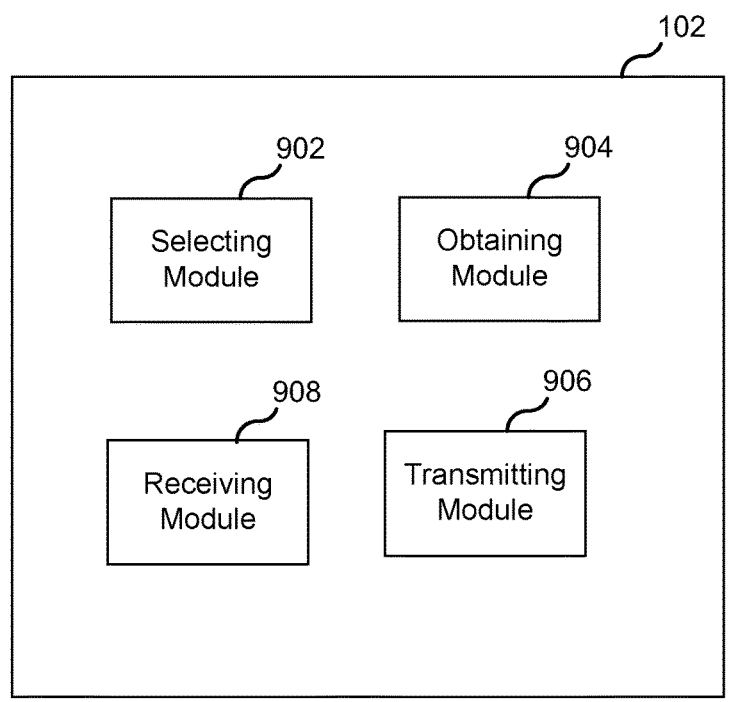
FIG. 9 is a diagram showing functional modules of a UE according to some embodiments.

FIG. 9 is a diagram showing functional modules of UE 102 according to some embodiments. As shown in FIG. 9, UE includes a selecting module (902) configured to select a home network slice identity (h-NSI), wherein the h-NSI is associated with an index value. The UE further includes an obtaining module (904) configured to obtain the index value with which the selected h-NSI is associated. The UE further includes a transmitting module (906) configured such that, after the index value is obtained, the transmitting module employs a transmitter to transmit a registration message towards a control node, the registration message comprising a requested NSI (r-NSI) (e.g., an S-NSSAI) and the obtained index value. The UE further includes a receiving module (908) operable to receive a registration response message comprising an allowed NSI (a-NSI) and an index value associated with the a-NSI.

Figure 10:
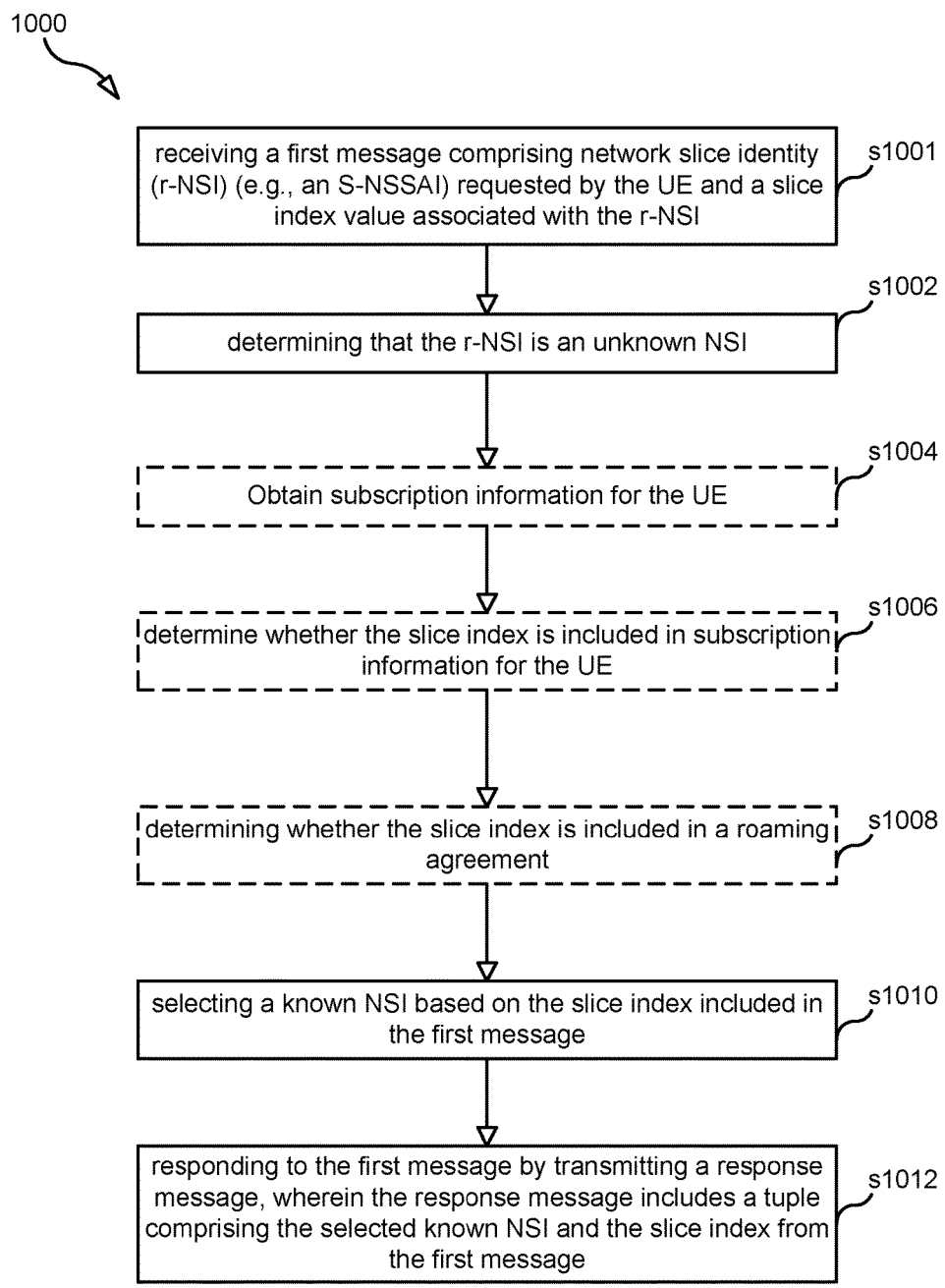
FIG. 10 is a flow chart illustrating a process according to some embodiments.
Figure 11:
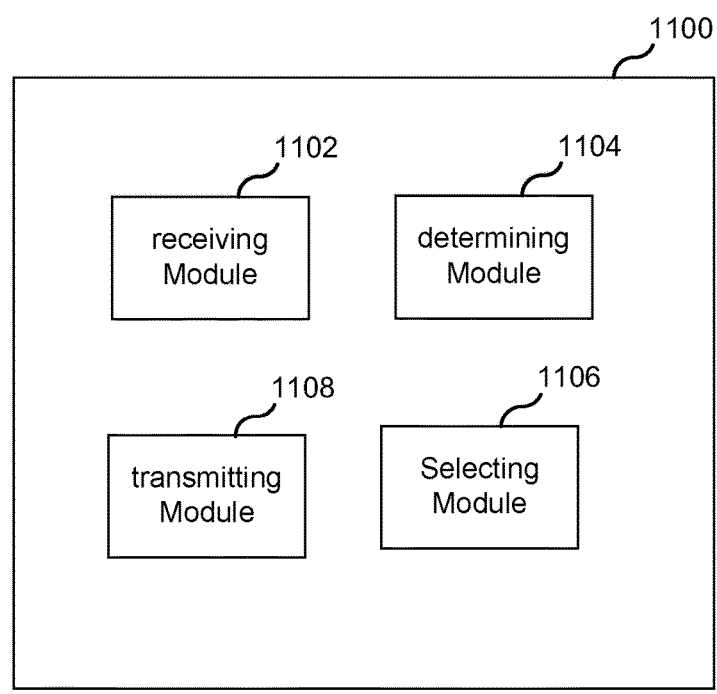
FIG. 11 is a diagram showing functional modules of a network node according to some embodiments.

FIG. 10 is a flow chart illustrating a process 1000 for registering a UE in a visited network. Process 100 includes: receiving a first message comprising network slice identity (r-NSI) (e.g., an S-NSSAI) requested by the UE and a slice index value associated with the r-NSI (step s1001); determining that the r-NSI is an unknown NSI (step s1002) (e.g., if the slice index included in the message does not match a slice index determined based on the r-NSI included in the message, then the r-NSI may be deemed as "unknown"); selecting a known NSI based on the slice index included in the first message (step s1010); and responding to the first message by transmitting a response message, wherein the response message includes a tuple comprising the selected known NSI and the slice index from the first message (step s1012).

In some embodiments, process 1000 is performed by a core network node in the visited network.

In some embodiments, process 1000 further includes obtaining subscription information for the UE (step s1004); and prior to responding to the first message and after receiving the first message, determining that the slice index is included in the subscription information for the UE (step s1006).

In some embodiments, process 1000 further includes determining that the slice index is included in a roaming agreement (step s1008).

In some embodiments, the step of transmitting the response message comprising the selected known NSI is performed as a result of determining that a) the slice index is included in the subscription information for the UE and b) the slice index is included in the roaming agreement.

In some embodiments, selecting a known NSI based on the slice index comprises selecting a known NSI that is associated with the slice index.

While various embodiments of the present disclosure are described herein, it should be understood that they have been presented by way of example only, and not limitation. Thus, the breadth and scope of the present disclosure should not be limited by any of the above-described exemplary embodiments. Moreover, any combination of the above-described elements in all possible variations thereof is encompassed by the disclosure unless otherwise indicated herein or otherwise clearly contradicted by context.

Additionally, while the processes described above and illustrated in the drawings are shown as a sequence of steps, this was done solely for the sake of illustration. Accordingly, it is contemplated that some steps may be added, some steps may be omitted, the order of the steps may be re-arranged, and some steps may be performed in parallel.

The invention claimed is:

1. A method for registering a user equipment, UE, in a visited network, the method comprising:
   the UE selecting a home network slice identity, h-NSI, wherein the h-NSI is associated with an index value;
   the UE obtaining the index value with which the selected h-NSI is associated;
   after obtaining the index value, the UE transmitting a registration message towards a control node, the registration message comprising a requested NSI, r-NSI, and the obtained index value; and
   the UE receiving a registration response message comprising an allowed NSI, a-NSI, and an index value associated with the a-NSI.

2. The method of claim 1, further comprising one of:
   storing, at the UE, home network configuration information associating each of a plurality of h-NSIs with a unique index value, wherein a first h-NSI is associated with a first index value and a second h-NSI is associated with a second index value; and
   storing, at the UE, home network configuration information associating each of a plurality of h-NSIs with an index value, wherein a first h-NSI is associated with a first index value and a second h-NSI is associated with the first index value.

3. The method of claim 1, wherein:
selecting an h-NSI comprises identifying an application and using application configuration information to select an h-NSI with which the identified application is associated, and
obtaining an index value with which the selected h-NSI is associated comprises using the home network configuration information to obtain the index value with which the selected h-NSI is associated.

4. The method of claim 1, further comprising:
the UE selecting the r-NSI based on the index value with which the selected h-NSI is associated.

5. The method of claim 4, wherein
the method further comprises storing, at the UE, a set of one or more visited NSIs (v-NSIs), wherein the v-NSIs are associated with the visited network, and
selecting the r-NSI based on the index value with which the selected h-NSI is associated comprises determining that the set of v-NSIs includes a v-NSI that is associated with the index value with which the selected h-NSI is associated and selecting as the r-NSI the v-NSI that is associated with the index value.

6. The method of claim 4, wherein
the method further comprises storing, at the UE, a set of one or more default NSIs (d-NSIs), and
selecting the r-NSI based on the index value with which the selected h-NSI is associated comprises determining that the set of d-NSIs includes a d-NSI that is associated with the index value with which the selected h-NSI is associated and selecting as the r-NSI the d-NSI that is associated with the index value.

7. The method of claim 6, wherein the set of d-NSIs is associated with a specific visited network or wherein the set of d-NSIs are for use with any visited network.

8. The method of claim 1, wherein
the a-NSI is different than the r-NSI,
the index value associated with the a-NSI is equal to the obtained index value included in the registration message, and
the method further comprises the UE updating locally stored configuration information for the visited network such that the updated locally stored configuration information for the visited network associates the a-NSI with the determined index value.

9. The method of claim 1, wherein the control node comprises a core access and mobility management function (AMF) of a home network and the accept message is received from an AMF in the visited network.

10. The method of claim 1, wherein obtaining the index value comprises:
finding the selected h-NSI in a lookup table, the lookup table comprising a set of one or more home network tuples, each home network tuple comprising an h-NSI and a slice index corresponding to the h-NSI; and
obtaining the index value associated with the selected h-NSI from the lookup table.

11. A computer program product comprising a non-transitory computer readable medium storing a computer program comprising instructions which, when executed on at least one processor, cause the at least one processor to carry out the method of claim 1.

12. A method for registering a user equipment, UE, in a visited network, the method comprising:

receiving a registration message transmitted by the UE, wherein the registration message comprises a requested network slice identity, NSI, and a slice index value paired with the requested NSI, r-NSI;
in response to receiving the registration message, transmitting a slice selection data request towards a Unified Data Management, UDM; and
receiving a slice selection data response message from the UDM comprising a list of one or more subscription tuples, each subscription tuple comprising a subscribed NSI (h-NSI) and a slice index corresponding to the h-NSI.

13. The method of claim 12, further comprising:
after receiving the registration request message, transmitting a slice selection request message to a control function (e.g., a network slice selection function (NSSF) and/or a network function repository function (NSF) and/or a combined NSSF and NRF (NRF+));
receiving from the control function a slice selection response message comprising a list of one or more allowed tuples, each allowed tuple comprising an a-NSI and a slice index corresponding to the a-NSI.

14. The method of claim 13, wherein the slice selection request message comprises
a first list of one or more requested tuples, each requested tuple comprising a r-NSI and a slice index corresponding to the r-NSI, and
a second list of one or more subscription tuples.

15. A method for registering a user equipment, UE, in a visited network, the method comprising:
receiving a first message comprising network slice identity (r-NSI) (e.g., an S-NSSAI) requested by the UE and a slice index value associated with the r-NSI;
determining that the r-NSI is an unknown NSI;
selecting a known NSI based on the slice index included in the first message; and
responding to the first message by transmitting a response message, wherein the response message includes a tuple comprising the selected known NSI and the slice index from the first message.

16. The method of claim 15, wherein the method is performed by a core network node in the visited network.

17. The method of claim 15, further comprising:
obtaining subscription information for the UE; and
prior to responding to the first message and after receiving the first message, determining that the slice index is included in the subscription information for the UE.

18. The method of claim 17, further comprising:
determining that the slice index is included in a roaming agreement.

19. The method of claim 18, wherein
the step of transmitting the response message comprising the selected known NSI is performed as a result of determining that a) the slice index is included in the subscription information for the UE and b) the slice index is included in the roaming agreement.

20. The method of claim 15, wherein
selecting a known NSI based on the slice index comprises selecting a known NSI that is associated with the slice index.

21. A user equipment, UE, the UE being adapted to:
select a home network slice identity (h-NSI), wherein the hNSI is associated with an index value;
obtain the index value with which the selected h-NSI is associated;
after obtaining the index value, transmit a registration message towards a control node, the registration message comprising a requested NSI (r-NSI) (e.g., an S-NSSAI) and the obtained index value; and receive a registration response message comprising an allowed NSI (a-NSI) and an index value associated with the a-NSI.

22. A control node, the control node being adapted to:

receive from a user equipment, UE, a registration message, wherein the registration message comprises a requested network slice identity (NSI) (e.g., an S-NSSAI) and a slice index value paired with the requested NSI (r-NSI);

transmit a slice selection data request towards a unified data management (UDM) in response to receiving the registration message; and receive a slice selection data response message from the UDM comprising a list of one or more subscription tuples, each subscription tuple comprising a subscribed NSI (h-NSI) and a slice index corresponding to the h-NSI.

23. A core network, CN, node, the CN node being configured to:

receive a first message comprising network slice identity (r-NSI) (e.g., an S-NSSAI) requested by the UE and a slice index value associated with the r-NSI;

determine that the r-NSI is an unknown NSI;

select a known NSI based on the slice index included in the first message; and respond to the first message by transmitting a response message, wherein the response message includes a tuple comprising the selected known NSI and the slice index from the first message.

* * * * *

UNITED STATES PATENT AND TRADEMARK OFFICE
CERTIFICATE OF CORRECTION

PATENT NO. : 10,462,644 B2
APPLICATION NO. : 16/317343
DATED : October 29, 2019
INVENTOR(S) : Ramle et al.

Page 1 of 1

It is certified that error appears in the above-identified patent and that said Letters Patent is hereby corrected as shown below:

In the Specification

In Column 5, Line 48, delete "S-NS SAIs" and insert -- S-NSSAIs --, therefor.

In Column 7, Line 38-39, delete "slice selection data response message m204" and insert -- slice selection data response message m206 --, therefor.

In Column 7, Line 50, delete "slice selection data response message m204)." and insert -- slice selection data response message m206). --, therefor.

In Column 9, Line 60, delete "slice selection data response message m304)." and insert -- slice selection data response message m306). --, therefor.

In Column 11, Line 45, delete ""13"" and insert -- "β" --, therefor.

In Column 11, Line 48, delete ""13"" and insert -- "β" --, therefor.

In Column 11, Line 58, delete "s501" and insert -- s502 --, therefor.

In Column 13, Line 64, delete "Process 100" and insert -- Process 1000 --, therefor.

In the Claims

In Column 15, Line 3, in Claim 2, delete "first index value." and insert -- second index value. --, therefor.

In Column 16, Line 24, in Claim 14, delete "comprises" and insert -- comprises: --, therefor.

In Column 16, Line 63, in Claim 21, delete "hNSI" and insert -- h-NSI --, therefor.

Signed and Sealed this
Nineteenth Day of May, 2020

Andrei Iancu
*Director of the United States Patent and Trademark Office*